United States Patent

Harada et al.

[11] Patent Number: 6,031,356
[45] Date of Patent: Feb. 29, 2000

[54] BATTERY CHARGING AND DISCHARGING CONTROL CIRCUIT WHICH CHARGES AN EXPANSION BATTERY ONLY IF THERE IS A FULL CHARGE ON AN INTERNAL BATTERY

[75] Inventors: Naofumi Harada, Fujisawa; Hirotaka Shimizu, Odawara; Kaoru Kawata, Sanda, all of Japan

[73] Assignee: Mitsubishi Denki Kabushiki Kaisha, Tokyo, Japan

[21] Appl. No.: 09/162,061

[22] Filed: Sep. 29, 1998

[30] Foreign Application Priority Data

Sep. 29, 1997 [JP] Japan ..................................... 9-263442

[51] Int. Cl.[7] ................................................. H01M 10/46
[52] U.S. Cl. .......................................................... 320/119
[58] Field of Search ...................................... 320/110, 116, 320/118, 119, 121, 126, 134, 136, 128, 137

[56] References Cited

U.S. PATENT DOCUMENTS 3,928,791  12/1975  Mullersman ............................ 320/119
4,851,756   7/1989  Schaller et al. ......................... 320/126
5,122,722   6/1992  Goedken et al. ........................ 320/116
5,818,200  10/1998  Cummings et al. .................... 320/116
5,867,007   2/1999  Kim ....................................... 320/118

FOREIGN PATENT DOCUMENTS

6-217464  8/1994  Japan .

Primary Examiner—Edward H. Tso
Attorney, Agent, or Firm—Burns, Doane, Swecker & Mathis, LLP

[57] ABSTRACT

An electronic device including an internal battery and an expansion battery can not be operated when the charge in both batteries is drained. Accordingly, when charging the batteries, a control circuit, after confirming that the internal battery is not fully charged, sets an FET to a conductive state and an FET to a non-conductive state. The result is that charging occurs from the internal battery provided the internal battery is not fully charged. After the internal battery is fully charged, the control circuit sets the FET to a non-conductive state and the FET to a conductive state so that this time the expansion battery is charged. Thus, if a short operating time is sufficient, the internal battery can be rapidly charged so that the electronic equipment can be operated by itself after charging for only a short period.

23 Claims, 3 Drawing Sheets

BATTERY CHARGING AND DISCHARGING CONTROL CIRCUIT WHICH CHARGES AN EXPANSION BATTERY ONLY IF THERE IS A FULL CHARGE ON AN INTERNAL BATTERY

BACKGROUND OF THE INVENTION

1. Field of the Invention

The present invention relates to a control circuit for battery charging and discharging. More particularly, the invention relates to a circuit for controlling the charging or discharging of a battery that is built into electronic equipment, and of an expansion battery that is provided separately from the built-in battery.

2. Description of the Related Art

Battery-powered electronic devices, such as portable telephones and portable computers, are extremely common and widespread. These electronic devices are often configured so as to allow an expansion battery to be attached in addition to the device's internal battery to extend operating time.

Figure 3:
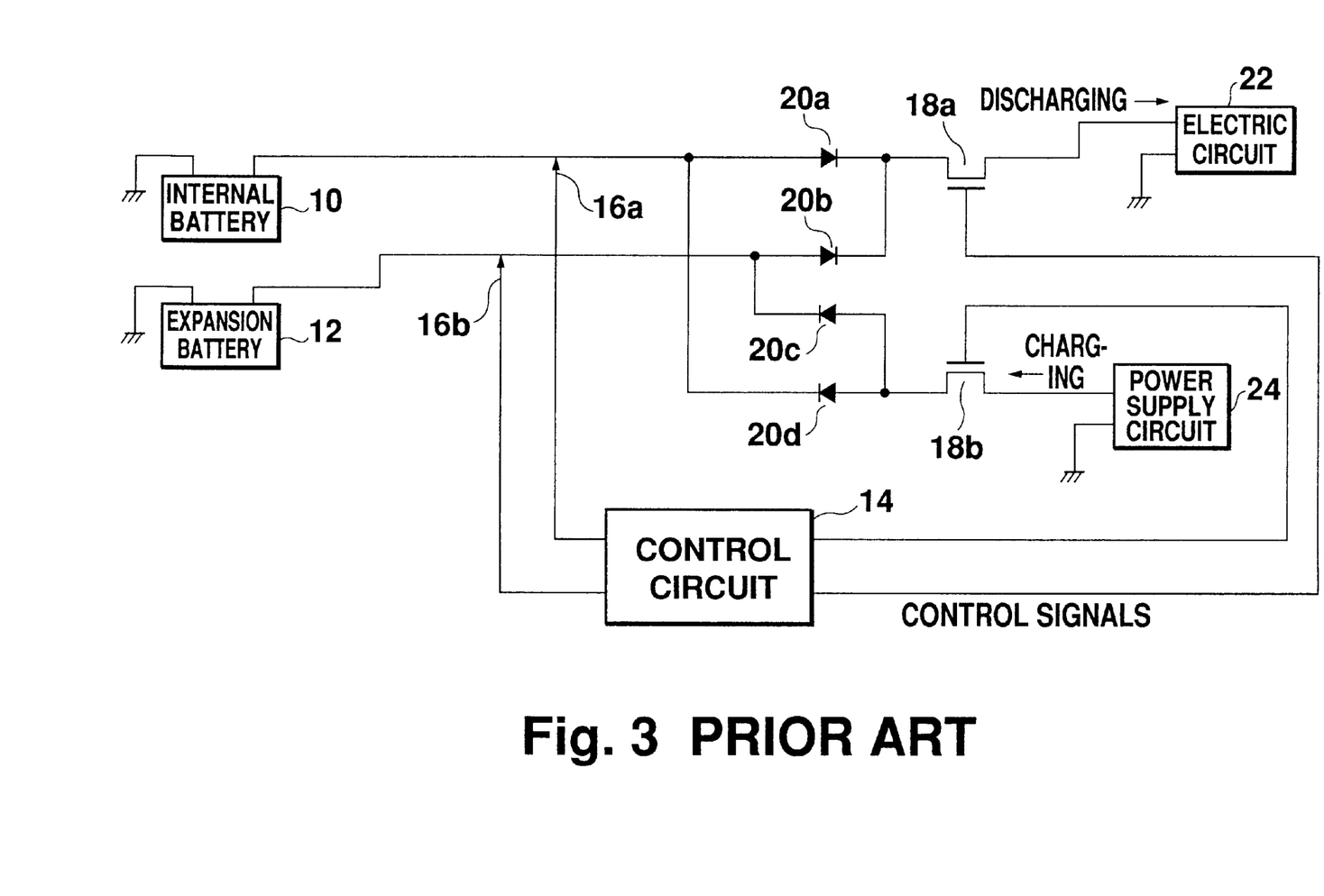
FIG. 3 is a block diagram of a known battery charging and discharging control circuit.

An example of a charging and discharging circuit for an internal battery is shown in FIG. 3. In the circuit shown in FIG. 3, an internal battery 10 and an expansion battery 12 are basically handled in parallel. In other words, charging and discharging of the internal battery 10 and the expansion battery 12 are performed at the same time.

Charging and discharging of the internal battery 10 and expansion battery 12 are controlled by a control circuit 14. The control circuit 14 monitors terminal voltages of the internal battery 10 and the expansion battery 12 with voltage sensors 16a, 16b. Amounts of charge in the internal battery 10 and in the expansion battery 12 are determined on the basis of these terminal voltages.

If it is judged that the internal battery 10 or the expansion battery 12 is fully charged, the control circuit 14 places an FET 18a (refer to FIG. 3) into a conductive state. In order to place the FET 18a into the conductive state, the control circuit 14 impresses a predetermined control signal onto a gate of the FET 18a. When the FET 18a enters the conductive state, discharging occurs from the internal battery 10 and expansion battery 12 through diodes 20a and 20b to an electric circuit 22. Power is supplied electric circuit 22, which may be a power drawing circuit of a portable telephone or a circuit such as a CPU in a notebook computer.

When discharging occurs in this manner, the internal battery 10 and the expansion battery 12 are connected in parallel so that discharging occurs simultaneously from both batteries.

On the other hand, when charging the batteries, the control circuit 14 places the FET 18a into a non-conductive state and an FET 18b into a conductive state. To place the FET 18b into the conductive state, the control circuit 14 impresses a predetermined control signal onto a gate of the FET 18b. When the FET 18b enters the conductive state, power is supplied from a power supply circuit 24 is to the internal battery 10 and the expansion battery 12 through respective diodes 20c and 20d. Thus, the internal battery 10 and the expansion battery 12 are also connected basically in parallel when being charged, and both batteries are therefore charged simultaneously.

Thus, according to the technique for charging and discharging batteries in the prior art, the internal battery 10 and the expansion battery 12 are parallely connected by diodes. Current therefore flows during both charging and discharging so that the remaining charge in both batteries is approximately equal.

More specifically, when battery discharging occurs, since the battery terminal voltage increases for the battery having a greater amount of charge, current flows from the battery having the higher terminal voltage because diodes 20a and 20b allow current to flow only from the battery having the higher terminal voltage.

On the other hand, when the batteries are charging, the internal resistance of the battery having the smaller amount of remaining charge lowers during charging. Therefore, after the internal battery 10 and expansion battery 12 are connected in parallel by diodes 20c and 20d, more charging current consequently flows to the battery having the lower internal resistance, in other words, the battery having the smaller amount of remaining charge. As a result, charging proceeds so that the amounts of charge are equal for internal battery 10 and expansion battery 12. In the invention of Japanese Patent Laid-Open Publication No. Hei 6-217464 charging is performed for a plurality of batteries from a battery closer to an internal battery so as to simplify battery removal, whereas discharging is performed from an external battery far from a computer.

In this manner, the charging and discharging operations in electronic equipment equipped with the internal battery 10 and the expansion battery 12 are performed simultaneously (in parallel) for the internal battery 10 and the expansion battery 12. Therefore, the amounts of charge in both batteries drop simultaneously with the use of the electronic equipment.

However, from the viewpoint of operating an electronic device, it is preferable that some charge remain in internal battery 10 when the amount of charge in the expansion battery 12 has reached 0, and further preferable to operate the electronic device using that power and to remove and charge the expansion battery 12 while using that power. This manner of operation would enhance the operability of such electronic equipment. In comparison, according to the art shown in FIG. 3, a current problem is that the use of the electronic equipment must often be temporarily halted when both the internal battery 10 and the expansion battery 12 simultaneously drop to an amount of charge of 0.

By maintaining an amount of charge in the internal battery even when the amount of charge in the expansion battery becomes empty, a system may be operated continuously without being halted.

SUMMARY OF THE INVENTION

The present invention, has an object of providing a battery charging and discharging circuit that allows electronic equipment to be operated using an internal battery even when the charge in an expansion battery has completely drained, by causing discharging to occur from the expansion battery 12 before the internal battery.

Also, during charging of the batteries, as an internal battery 10 and an expansion battery 12 are charged simultaneously, in order to use, for example, the electronic equipment for only one hour, the internal battery 10 must be charged for 30 minutes and the expansion battery 12 must be charged for 30 minutes. However, if the internal battery 10 has a charging capacity by design of one hour, it is more advantageous to charge only the internal battery 10, and then use only the internal battery 10. This would make the electronic equipment easier to carry as the heavy expansion battery 12 need not be installed into the electronic equipment.

Currently, many users address this problem by removing one expansion battery and charging the internal battery until it has reached a full charge. However, battery removal is troublesome, and, furthermore, when the expansion battery becomes necessary, it is troublesome and time consuming to once again install and further charge the expansion battery.

Another object of the present invention is to provide a method for charging the internal battery before the expansion battery so that the electronic equipment can be carried and used by itself when the expansion battery is not needed.

When both batteries reach an empty charge, charging the internal battery prior to charging the expansion battery prepares for situations when it is desirable to carry only the electronic equipment, and not the spare battery.

In other words, this eliminates the need of carrying the heavy expansion battery.

A configuration of present invention comprises, in a battery charging control circuit for controlling charging of an internal battery that is built into an electronic device and a separately installed expansion battery, an internal charge switching circuit for supplying charging power to the internal battery, an expansion charge switching circuit for supplying charging power to the expansion battery, and a control circuit for controlling the internal charge switching circuit and the expansion charge switching circuit, wherein the control circuit sets only the internal charge switching circuit to a conductive state to charge the internal battery when the internal battery is not in a fully charged state.

The control circuit of the present invention sets the internal charge switching circuit to a non-conductive state after charging of the internal battery completes, and sets the expansion charge switching circuit to a conductive state to charge the expansion battery.

The present invention may also comprise an expansion discharge switching circuit for discharging the expansion battery, wherein the control circuit sets the expansion discharge switching circuit to a conductive state to set a state in which the expansion battery can be discharged even while the internal charge switching circuit has been set to the conductive state and charging of the internal battery is being performed.

A further configuration of the present invention comprises an internal discharge switching circuit for discharging the internal battery, wherein the control circuit sets the internal discharge switching circuit to a conductive state to set a state in which the internal battery can be discharged, even while the external charge switching circuit has been set to a conductive state and charging of the expansion battery is being performed.

In yet another configuration, the present invention may comprise, in a battery charging control circuit for controlling the charging of an internal battery that is built into an electronic device and of a plurality of small expansion batteries that are installed separately from the internal battery, an internal charge switching circuit for supplying charging power to the internal battery, a plurality of small expansion charge switching circuits installed to correspond to respective batteries among the plurality of small expansion batteries for supplying charging power to them, and a control circuit for controlling the internal charge switching circuit and the plurality of small expansion charge switching circuits, where the control circuit sets only the internal charge switching circuit to the conductive state to charge the internal battery when the internal battery is not in the fully charged state.

Such a control circuit of the present invention sets, after charging of the internal battery completes, the internal charge switching circuit to the non-conductive state and sets the plurality of expansion charge switching circuits in sequence to a conductive state to charge the small expansion batteries in sequence.

A still further configuration of the present invention comprises a plurality of small expansion discharge switching circuits, which correspond to respective batteries among the plurality of small expansion batteries for discharging the corresponding small expansion batteries, wherein the control circuit sets any one of the plurality of small expansion switching circuits to a conductive state to set a state in which any of the small expansion batteries can be discharged, even while the internal charge switching circuit has been set to the conductive state and charging of the internal battery is being performed.

The present invention may also comprise an internal discharge switching circuit for discharging the internal battery, wherein the control circuit sets the internal discharge switching circuit to the conductive state to set a state in which the internal battery can be discharged, even while the plurality of expansion charge switching circuits have been set to conductive states and charging of one of the plurality of small expansion batteries is being performed.

The present invention may further comprise, in a battery discharging control circuit for controlling the discharging of the internal battery of an electronic device and a separately installed expansion battery from the internal battery, an internal discharge switching circuit for connecting the internal battery to a predetermined electric circuit and causing the internal battery to discharge, an expansion discharge switching circuit for connecting the expansion battery to the predetermined electric circuit and causing the expansion battery to discharge, and a control circuit for controlling the internal discharge switching circuit and the expansion discharge switching circuit, where the control circuit sets only the expansion discharge switching circuit to the conductive state so as to cause the expansion battery to discharge when there exists a remaining amount of charge in the expansion battery.

The control circuit of the present invention may set the expansion discharge switching circuit to a non-conductive state after discharging of the expansion battery completes, and set only the internal discharge switching circuit to the conductive state so as to cause the internal battery to discharge.

Yet another aspect of the present invention comprises, in a battery discharging control circuit for controlling the discharging of an internal battery in an electronic device and a plurality of separately installed small expansion batteries, an internal discharge switching circuit for causing the internal battery to discharge, a small expansion discharge switching circuit installed at every one of the plurality of small expansion batteries for causing respectively corresponding small expansion batteries to discharge, and a control circuit for controlling the internal discharge switching circuit and the plurality of small expansion discharge switching circuits, wherein the control circuit sequentially sets to a conductive state the plurality of small expansion discharge switching circuits one at a time so as to cause the corresponding plurality of small expansion batteries to discharge in sequence when there exists a remaining amount of charge in any one of the plurality of small expansion batteries.

Such a control circuit sets, after discharging of the plurality of small expansion batteries all completes, the plurality of small expansion discharge switching circuits to non-conductive states and sets only the internal discharge switching circuit to a conductive state so as to cause the internal battery to discharge.

DETAILED DESCRIPTION OF THE PREFERRED EMBODIMENTS

Preferred embodiments of the present invention will be described in the following with reference to the drawings.

Embodiment 1

Figure 1:
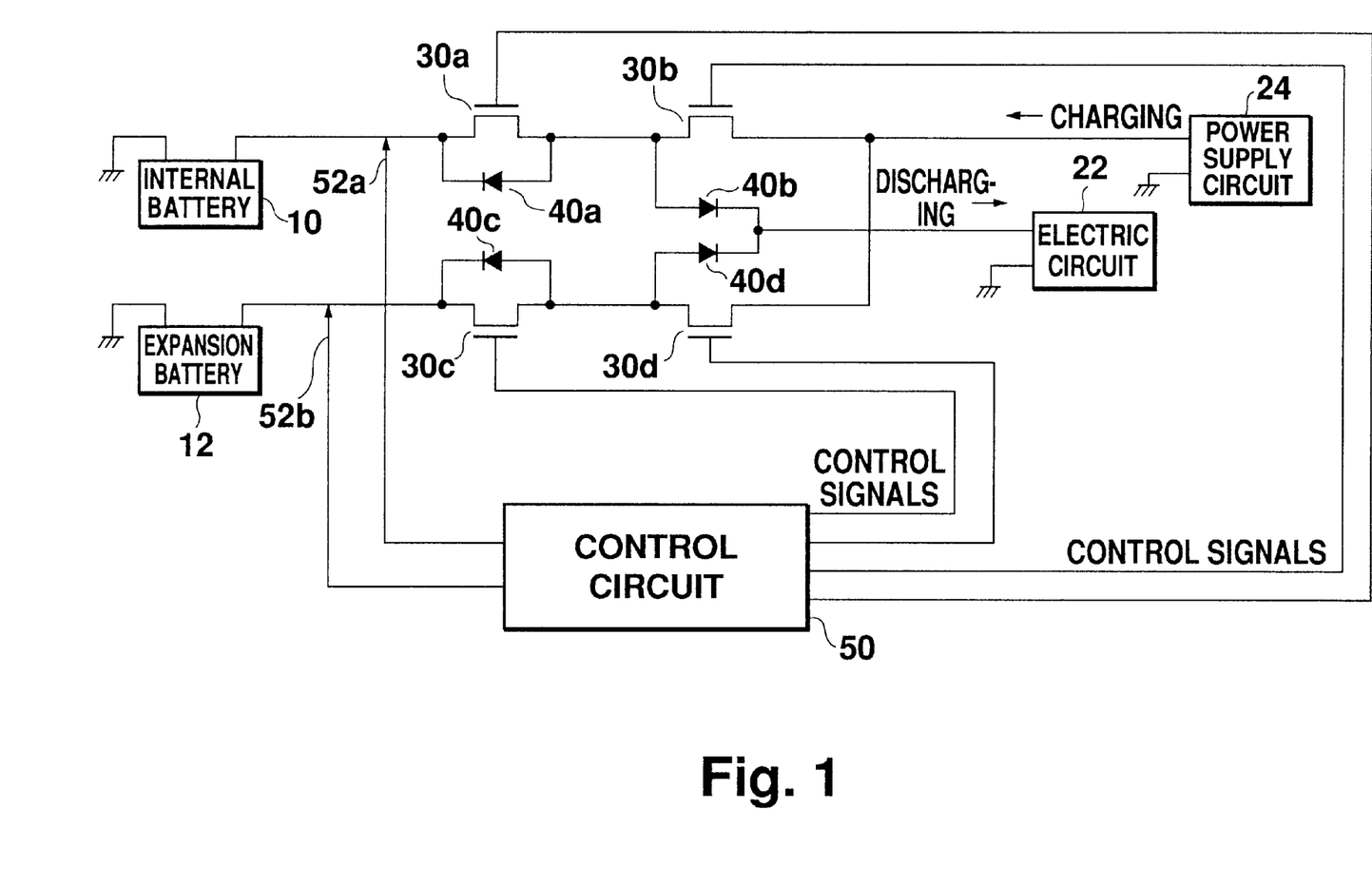
FIG. 1 is a block diagram showing a configuration of a battery charging and discharging control circuit relating to a preferred embodiment of the present invention.

FIG. 1 shows a circuit diagram of a control circuit, in an electronic device including an internal battery 10 and an expansion battery 12, for controlling charging and discharging of both batteries.

A feature of this embodiment is that charging of the batteries is performed first to the internal battery 10, while discharging of the batteries is performed first from the expansion battery 12. Unlike the art described above, in this embodiment does not handle the internal battery 10 and the expansion battery 12 in parallel.

As shown in FIG. 1, the internal battery 10 is connected to an FET 30a. Connected in parallel to this PET 30a is a diode 40a. Connected to the FET 30a in series is an FET 30b. The FET 30b is connected between the first FET 30a and a power supply circuit 24. The connecting point between the FET 30a and the FET 30b is connected through a diode 40b to the electric circuit 22 to which electric power is to be supplied.

Therefore, when the FET 30a is in a conductive state, discharging occurs from the internal battery 10 through FET 30a and diode 40b to the electric circuit 22.

On the other hand, when the FET 30b is in a conductive state, charging occurs from the power supply circuit 24 through the FET 30b and the first diode 40a to the internal battery 10.

Control of the conductive and non-conductive states of FET 30a and FET 30b is performed by control signals supplied to the respective gates of FET 30a and FET 30b. Similar to as in the known art, these control signals are output by a control circuit 50. The control circuit 50 also monitors the terminal voltage of, for example, the internal battery 10 by using a voltage sensor 52a, and outputs the above-mentioned control signals according to the state of charge in the internal battery 10 and expansion battery 12.

A circuit similar to that for the internal battery 10 may also be used for charging and discharging the expansion battery 12. For example, as shown in FIG. 1, an FET 30c is connected to the expansion battery 12, and to the FET 30c is connected in series an FET 30d. Namely, the FET 30c is connected between the expansion battery 12 and the FET 30d. Similar to the case for the internal battery 10, the FET 30d is connected between the FET 30c and the power supply circuit 24. Furthermore, similar to the above-mentioned FET 30a, a diode 40c is connected in parallel to the FET 30c. The connecting point between the FET 30c and the FET 30d is connected to the electric circuit 22 through a diode 40d.

Therefore, in this configuration, similar to the case for the above-mentioned internal battery 10, when the FET 30c is in a conductive state, discharging occurs from the expansion battery 12 through FET 30c and diode 40d to the electric circuit 22.

On the other hand, when the FET 30d is in a conductive state, charging occurs to the expansion battery 12 from the power supply circuit 24 through FET 30d and diode 40c.

Control of the conductive states of FET 30c and FET 30d is performed by the control circuit 50, which adjusts control signals that are impressed onto the gates of both FETs.

Configuring the circuit as described above allows battery charging and discharging operations to be performed as described below.

For the charging operation, the internal battery 10 is usually charged first, provided it is not already fully charged. More specifically, the control signals are adjusted so that FET 30b is in a conductive state, while FET 30d is in a non-conductive state.

The FET 30b is equivalent to the internal charge switching circuit in the present invention. Although an FET was used in this embodiment, another switching device, such as a thyristor, may also be used.

As a result, charging of the internal battery 10 occurs from the power supply circuit 24 through FET 30b and the first diode 40a. Various types of power supply circuits may be used, such as AC adapters or the power supply circuits that are built into electronic equipment.

The control circuit 50 monitors the voltage sensor 52a to determine whether or not the internal battery 10 is fully charged.

Conventional techniques for monitoring the terminal voltage to determine whether or not a battery is fully charged are widely known.

Charging of the expansion battery 12 begins after charging of the internal battery 10 completes. In order for charging of the expansion battery 12 to occur, the FET 30b is set from the conductive state to the non-conductive state, which stops the charging current from flowing to the internal battery 10. The FET 30d is next set to the conductive state.

The FET 30d is equivalent to the expansion charge switching circuit in the present invention. Although an FET was used in this embodiment, any appropriate switching device, such as a thyristor, may also be used.

Thus, charging of the expansion battery 12 occurs from the power supply circuit 24 through FET 30d and diode 40c. As a result, charging of the expansion battery 12 begins.

This control of the conductive and non-conductive states of FET 30b and FET 30d is performed by control signals from the control circuit 50.

A feature of this embodiment is that the charging of the batteries is initiated first from the internal battery 10. Initiating the charging operation first from the internal battery 10 enables the electronic equipment to be operated from the internal battery 10 only, and the expansion battery 12 can be removed when the electronic device is operated for a short time. Thus, an advantage is realized in that such electronic equipment can be mobily used without extra batteries after charging for only a short time.

The control circuit 50 is equivalent to the control circuit in the present invention.

A discharging operation from the batteries by using the batteries to drive the electric circuit 22 will next be described below.

In the discharging operation, which is opposite from the above-mentioned charging operation, discharging occurs from he expansion battery 12 when there is a remaining amount of charge in the expansion battery 12, and after the amount of charge in the expansion battery 12 reaches 0, discharging is initiated from the internal battery 10.

First, when there is an amount of charge remaining in the expansion battery 12, the FET 30a is set to the non-conductive state, whereas the FET 30c is set to the conductive state. As a result, discharging occurs from the expansion battery 12 through FET 30c and diode 40d to the electric circuit 22.

The FET 30c is equivalent to the expansion discharge switching circuit in the present invention.

The control circuit 50 monitors a voltage sensor 52b to determine whether or not there is an amount of charge remaining in the expansion battery 12.

After the expansion battery 12 is discharged and the amount of charge in the expansion battery 12 reaches 0, the internal battery 10 is discharged to the electric circuit 22. In order to discharge from the internal battery 10, the FET 30a is set to the conductive state, which is opposite from when discharging from the expansion battery 12. Next, by setting the FET 30c to a non-conductive state, discharging occurs from the internal battery 10 to the electric circuit 22 through FET 30a and diode 40b. In this case, the FET 30c is in the non-conductive state so discharging does not occur from the expansion battery 12.

The FET 30a is therefore an internal discharge switching circuit of the present invention.

A feature of this embodiment is that the discharging of the batteries is performed from the expansion battery 12 and discharging of the internal battery 10 is initiated after the amount of charge in the expansion battery 12 reaches 0. Thus, as discharging was performed first from the expansion battery 12, use of the electronic equipment can be continued by using the internal battery 10, even after the expansion battery 12 is completely drained. The expansion battery 12 can therefore be removed and charging can be performed for the expansion battery 12 while the electronic equipment is being driven using the internal battery 10. As a result, the internal battery 10 can be used as a so-called "bridge battery" during replacement of the expansion battery 12.

In this embodiment, unlike the related art in which the internal battery 10 and the expansion battery 12 both are completely drained, the electronic equipment can be used continuously by using the internal battery 10, even when the amount of charge in the expansion battery 12 reaches 0.

Embodiment 2

In embodiment 1 described above, the control circuit 50 monitored the amounts of charge in the internal battery 10 and expansion battery 12 using the voltage sensors 52a, 52b, and adjusted the conductive and non-conductive states of the FETs based on the respective amounts of charge. Basically, either the operation for battery charging or the operation for battery discharging is performed by such a configuration.

However, there may be instances where commercial electric power is supplied to the power supply circuit 24, such as an AC adapter, is momentarily interrupted. In order to cope with these sorts of instances, it is preferable to provide a connection so that the expansion battery 12 can be discharged, even while the internal battery 10 is being charged. In other words, electric power from the power supply circuit 24 is directly supplied to the electric circuit 22 while the internal battery 10 is being charged. If, in such a case, commercial electric power is momentarily interrupted that electric power is not supplied to the power supply circuit 24, the supply of electric power from the power supply circuit 24 to the electric circuit 22 stops. If the expansion battery 12 is in a state where it can be discharged, the supply source of electric power switches from the power supply circuit 24 to the expansion battery 12, and the electric power from the expansion battery 12 is supplied to the electric circuit 22. In this way, stable electric power is constantly supplied to the electric circuit 22. Similarly, if a connection is provided so that the internal battery 10 can be discharged even while the expansion battery 12 is being charged, the electric power from the internal battery 10 can be supplied to the electric circuit 22, even though the supply of electrical power to the power supply circuit 24 may have stopped.

To realize this sort of connection, it is desirable to control the conductive and non-conductive states of the FETs as described below.

First, in order to charge the internal battery 10 from the power supply circuit 24, the FET 30b is set to the conductive state and the FET 30d is set to the non-conductive state. From this state, the FET 30c is set to a conductive state so that discharging from the expansion battery 12 can occur. Even with the FET 30c in the conductive state, discharging from the expansion battery 12 does not generally occur due to the functions of diode 40b and diode 40d since the charging voltage from the power supply circuit 24 is generally higher than the voltage of the expansion battery 12.

However, when the voltage that is supplied to the electric circuit 22 drops due to a failure of the power supply circuit 24, discharging from the expansion battery 12 to the electric circuit 22 through diode 40d immediately begins. In this manner, it is possible to cope with momentary interruptions in the power supply by, for example, setting the FET 30c to the conductive state even while the internal battery 10 is being charged.

In the configuration described above, discharging occurs from the expansion battery 12, even while the internal battery 10 is being charged. However, it is also preferable to have the configuration permit discharging from the internal battery 10 while the expansion battery 12 is being charged.

In order to charge the expansion battery 12, the FET 30b is set to the non-conductive state and the FET 30d is set to the conductive state. With the FETs in these states, charging of the expansion battery 12 occurs from the power supply circuit 24 through the FET 30d. To enable discharging from the internal battery 10 to occur in this state, the FET 30a is further set to the conductive state. This manner of setting immediately enables discharging to occur from the internal battery 10, even when the power supply circuit 24 has failed.

Thus, since connections were made in this embodiment so that the expansion battery 12 (or internal battery 10) can be discharged even while the internal battery 10 (or expansion battery 12) is being charged, the operation of the electronic equipment can be smoothly continued even if, for example, there is a momentary interruption in the power supply.

Embodiment 3

In the above-mentioned embodiments 1 and 2, the battery charging and discharging operations were described for a case in which there exists one expansion battery 12 to complement the internal battery 10.

However, some electronic devices allow for a plurality of expansion batteries 12a, 12b to complement the internal battery 10. In such cases as well, where the plurality of expansion batteries 12a, 12b have been provided, a battery charging and discharging technique can be employed in which charging is performed from the internal battery 10, and discharging is performed from the expansion batteries 12a, 12b. A battery charging and discharging control circuit that uses this sort of technique is shown in FIG. 2.

The expansion batteries 12a, 12b are one example of small expansion batteries as used in the present invention.

Figure 2:
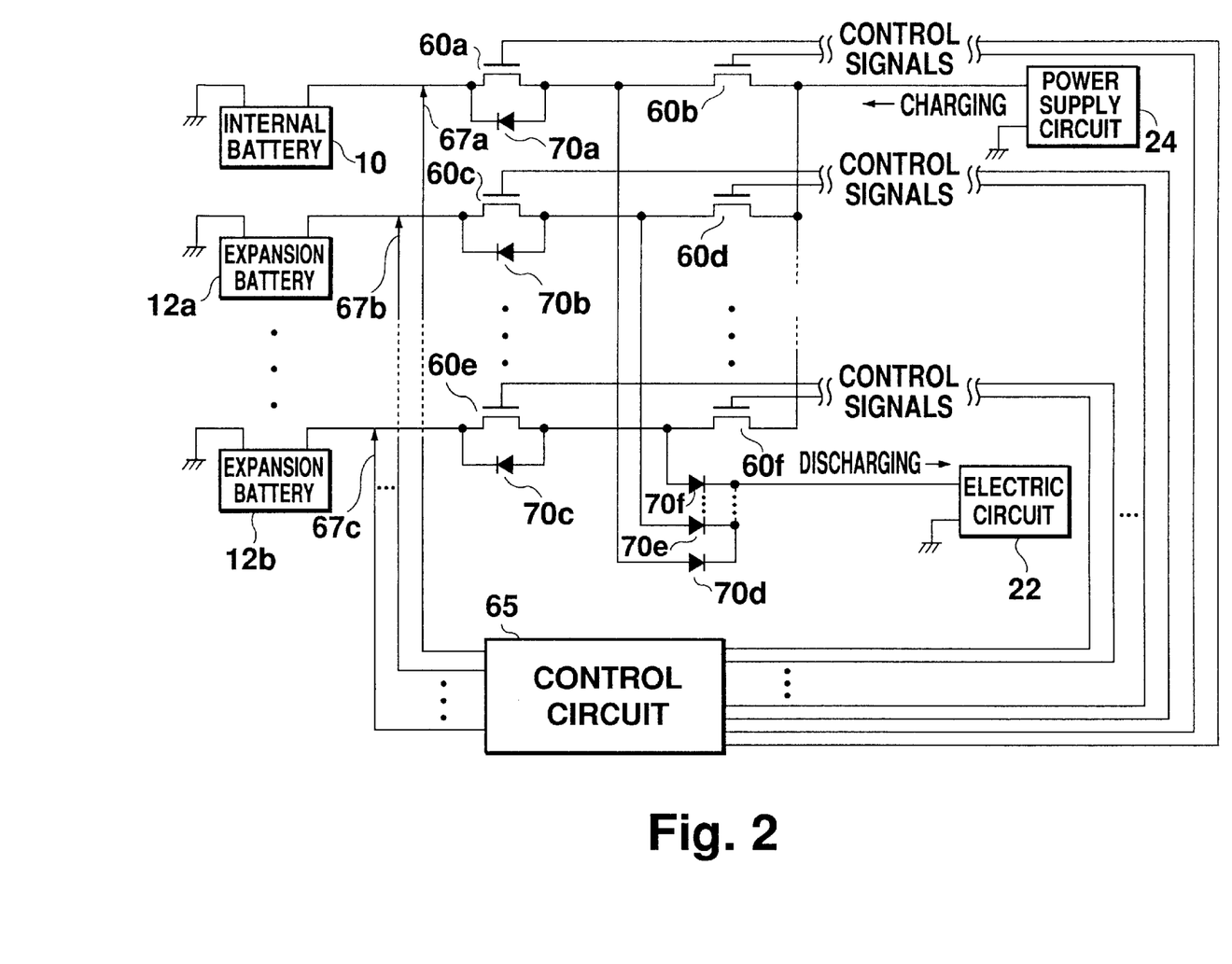
FIG. 2 is a block diagram of the battery charging and discharging control circuit having a plurality of expansion batteries.

As shown in FIG. 2, the basic circuit configuration including the plurality of expansion batteries 12a, 12b in complement to the internal battery 10 is similar to FIG. 1.

An FET 60a is connected to the internal battery 10, and an FET 60b is in turn connected to the FET 60a. The FET 60a is connected between the internal battery 10 and the FET 60b, and the FET 60b is connected between the FET 60a and the power supply circuit 24. A diode 70a is connected in parallel to FET 60a. More specifically, the diode 70a is connected between a source and drain terminals of the FET 60a.

Substantially identical circuit configurations have been formed for expansion batteries 12a and 12b, for connection to the power supply circuit 24. A diode 70d is provided through which the connecting point between the FET 60a and the FET 60b for the internal battery 10 is connected to the electric circuit 22 to which electric power is to be supplied. Similarly, diodes 70e and 70f are provided in the circuits corresponding to the expansion battery 12a and expansion battery 12b, and are connected to the electric circuit 22. Discharging occurs to the electric circuit 22 through these diodes 70d, 70e, and 70f.

In this embodiment 3, a control circuit 65 basically performs operations similar to those of the control circuit 50 in the above-mentioned embodiments 1 and 2. However, because the plurality of expansion batteries 12a, 12b are provided, three or more voltage sensors 67a, 67b, 67c are provided in the control circuit 65 through which the terminal voltages of the internal battery 10 and expansion batteries 12a, 12b are monitored. Furthermore, as shown in FIG. 2, control signals from the control circuit 65 are impressed onto the gates of all the FETs so as to control their conductive and non-conductive states.

An operation of the circuit in embodiment 3 (refer to FIG. 2) is substantially identical to that of the above-mentioned embodiments 1 and 2.

Namely, when charging the batteries, the internal battery 10, if not fully charged, is first charged. Charging of the other batteries next proceeds in a sequence of expansion battery 12a, then expansion battery 12b.

In this manner, one FET among the FETs 60b, 60d, and 60f in this embodiment is placed in a conductive state, and the battery that connects to the FET that has been placed in the conductive state is charged. In this embodiment, charging of the internal battery 10 is performed first, if that battery is not fully charged. In other words, the FET 60b is first set to the conductive state, and the internal battery 10 is charged. After the internal battery 10 is charged, the FET 60d next enters the conductive state, and the FET 60b, which was until now in the conductive state, is set to a non-conductive state. As a result, the expansion battery 12a is charged. The FET 60f then enters the conductive state and charging of the expansion battery 12b is performed. In this manner, charging of the batteries is performed in sequence beginning with the internal battery 10 so that, unlike cases all the batteries are charged in parallel, just the expansion battery 12a or the expansion battery 12b can be charged to meet the required operating time.

The FET 60d and FET 60f are one example of the small expansion charge switching circuits used in the present invention.

For a short operating time, for example, the electronic equipment can be operated using only the internal battery 10 as described above, and can be used immediately simply by charging that internal battery 10. In such a case, the electronic equipment can be used without installing the expansion batteries 12a, 12b. If a longer operating time is desired, the electronic equipment can be used by first charging the internal battery 10 and the expansion battery 12a. If operating the device for an even longer time is desired, charging the expansion batteries 12a, 12b in addition to the internal battery 10 yields a longer operating time. Thus, according to this embodiment, the charging time can be flexibly set to meet the user's operating requirements for an electronic device.

A discharging operation in this embodiment will next be described. In the discharging operation, discharging occurs from either of the expansion batteries 12a, 12b, provided there is an amount of charge remaining in those batteries.

When the amount of charge in all expansion batteries 12a, 12b reaches 0, the internal battery 10 is next discharged.

In embodiment 3, one FET (or more than one FET if a large amount of current is particularly necessary) among the FETS 60a, 60c, and 60e enters a conductive state, and discharging occurs from the corresponding battery.

More specifically, discharging is performed in this embodiment from the expansion battery 12b provided some charge remains in that battery, and, when the amount of charge reaches 0, discharging of the next expansion battery, 12a, is initiated. When the amount of charge in the expansion battery 12a reaches 0, discharging of the internal battery 10 is initiated.

The FET 60e enters a conductive state for the expansion battery 12b to discharge while the FET 60c enters a conductive state for the expansion battery 12a to discharge. FET 60e and FET 60c act as the small expansion discharge switching circuits in the present invention.

In this manner, after the amounts of charge in all expansion batteries 12a, 12b in embodiment 3 reach 0, discharging from the internal battery 10 is performed. Therefore, electronic equipment can be operated by the internal battery 10, even during replacement of the expansion batteries 12a, 12b so that highly serviceable electronic equipment can be configured.

As described above, with charging performed from the internal battery according to the present invention, provided the internal battery is not fully charged, a battery charging and discharging control circuit can be realized that allows the electronic equipment to be carried and used by itself after charging for a short period. More specifically, according to the present invention, the system can continue to operate without interruption. The present invention is also suitable for instances when it is desirable to carry only the electronic device itself. Also, an advantage of time savings is realized.

Furthermore, according to the present invention, since the expansion battery is charged after charging of the internal battery completes, a battery charging and discharging control circuit can be realized to allow charging of the expansion battery while the amount of charge in the internal battery is largely maintained.

Furthermore, according to the present invention, with the expansion battery placed in a state in which it can discharge even while charging of the internal battery is being performed, a battery charging and discharging control circuit can be realized to allow the operation of the electronic device to continue, even when the power supply is interrupted or switched.

Conversely, according to the present invention, with the internal battery placed in a state in which it can discharge even while charging of the expansion battery is instead being performed, a battery charging and discharging control circuit can be realized that will cope interruptions or fluctuations in the power supply.

Furthermore, according to the present invention, because charging is initiated from the internal battery even in cases where a plurality of small expansion batteries have been provided, a battery charging and discharging control circuit can be realized that will allow the electronic equipment to be carried and used by itself after charging for a short time.

Furthermore, according to the present invention, since the plurality of small expansion batteries are charged in sequence after charging of the internal battery completes, a battery charging and discharging control circuit can be realized to allow the quick portable operation of the electronic equipment by charging only a minimum number of small expansion batteries necessary to meet the desirable operating time of the electronic equipment.

Furthermore, according to the present invention, when one of the plurality of small expansion batteries is placed in a state in which it can discharge even while charging of the internal battery is being performed, a battery charging and discharging control circuit can be realized to cope with interruptions or fluctuations in the power supply being interrupted or switched.

Furthermore, according to the present invention, with the internal battery placed in a state in which it can discharge even when one of the plurality of expansion batteries has been charged, a battery charging and discharging control circuit can be realized that can cope with interruptions or fluctuations in the power supply.

Furthermore, according to the present invention, since discharging from the expansion battery is performed as long there exists an amount of remaining charge in that battery, the amount of charge in the internal battery can be largely maintained even if the amount of charge in the expansion battery reaches 0. Thus, replacement or charging of the expansion battery can be performed while the operation of the electronic equipment is continued. As a result, the internal battery can be used as a so-called "bridge battery" during replacement of the expansion battery.

Furthermore, according to the present invention, since discharging of the internal battery is performed after discharging of the expansion battery completes, a battery charging and discharging control circuit can be realized to further extend the operating time of the electronic equipment.

Furthermore, according to the present invention, since the plurality of small expansion batteries are discharged one at a time when there exists a remaining amount of charge in any of the small expansion batteries, it is possible to maintain the amount of charge in the other small expansion batteries so that the operation of the electronic equipment can be continued even if the amount of charge in any of the small expansion batteries reaches 0, such as while replacing or charging the fully drained expansion battery.

Furthermore, according to the present invention, discharging of the internal battery is performed after discharging of the plurality of small expansion batteries all completes. Thus, a battery charging and discharging control circuit can be realized to allow the small expansion batteries to be removed for charging or replacement while operation of the electronic equipment is performed with the internal battery.

While there have been described what are at present considered to be preferred embodiments of the invention, it will be understood that various modifications may be made thereto, and it is intended that the appended claims cover all such modifications as fall within the true spirit and scope of the invention.

What is claimed is:

1. A battery charging and discharging control circuit for controlling charging and discharging of an internal battery of an electronic device and an expansion battery that is disposed separately from said internal battery, comprising:

an internal charge switching circuit for supplying charging power to said internal battery;

an expansion charge switching circuit for supplying charging power to said expansion battery; and a control circuit for controlling said internal charge switching circuit and said expansion charge switching circuit; wherein said control circuit sets only said internal charge switching circuit to a conductive state so as to charge said internal battery when said internal battery is not in a fully charged state.

2. A battery charging and discharging control circuit according to claim 1 wherein said control circuit sets, after charging of said internal battery completes, said internal charge switching circuit to a non-conductive state and sets only said expansion charge switching circuit to a conductive state so as to charge said expansion battery.

3. A battery charging and discharging control circuit according to claim 1, comprising an expansion discharge switching circuit for discharging said expansion battery, wherein said control circuit sets said expansion discharge switching circuit to a conductive state so as to set a state in which said expansion battery can be discharged even when said internal charge switching circuit has been set to the conductive state and charging of said internal battery is being performed.

4. A battery charging and discharging control circuit according to claim 2, comprising an internal discharge switching circuit for discharging said said internal battery, wherein said control circuit sets said internal discharge switching circuit to a conductive state so as to set a state in which said internal battery can discharge even when said expansion charge switching circuit has been set to the conductive state and charging of said expansion battery is being performed.

5. A battery charging and discharging control circuit according to claim 3, comprising an internal discharge switching circuit for discharging said said internal battery, wherein said control circuit sets said internal discharge switching circuit to a conductive state so as to set a state in which said internal battery can discharge even when said expansion charge switching circuit has been set to the conductive state and charging of said expansion battery is being performed.

6. A battery charging and discharging control circuit according to claim 1, wherein said expansion battery is detachable from said electronic device.

7. A battery charging and discharging control circuit according to claim 1 comprising an internal discharge switching circuit for discharging said internal battery, wherein said control circuit sets said internal discharge switching circuit to a conductive state so as to set a state in which said internal battery can be discharged even when said expansion charge switching circuit has been set to the conductive state and charging of said expansion battery is being performed.

8. A battery charging and discharging control circuit wherein a battery charging control circuit for controlling the charging of an internal battery of an electronic device and a plurality of small expansion batteries that are disposed separately from said internal battery, comprises:
- an internal charge switching circuit for supplying charging power to said internal battery;
- a plurality of small expansion charge switching circuits disposed to respectively correspond to said plurality of small expansion batteries, for supplying charging power to corresponding said small expansion batteries among said plurality of small expansion batteries; and
- a control circuit for controlling said internal charge switching circuit and said plurality of small expansion charge switching circuits; wherein
  - said control circuit sets only said internal charge switching circuit to a conductive state so as to charge said internal battery when said internal battery is not in a fully charged state.

9. A battery charging and discharging control circuit according to claim 5, wherein said plurality of small expansion batteries is detachable from said electronic device.

10. A battery charging and discharging control circuit according to claim 1 wherein said control circuit sets, after charging of said internal battery completes, said internal charge switching circuit to the non-conductive state and sets said plurality of expansion charge switching circuits in sequence to conductive states so as to charge said small expansion batteries in sequence.

11. A battery charging and discharging control circuit according to claim 1 comprising:
- a plurality of small expansion discharge switching circuits disposed to respectively correspond to said plurality of small expansion batteries, for discharging said respective small expansion batteries;
- said control circuit sets any one of said plurality of small expansion discharge switching circuits to a conductive state so as to set a state in which one of said small expansion batteries can be discharged even when said internal charge switching circuit has been set to the conductive state and charging of said internal battery is being performed.

12. A battery charging and discharging control circuit according to claim 1 comprising an internal discharge switching circuit for discharging said internal battery, wherein said control circuit sets said internal discharge switching circuit to a conductive state so as to set a state in which said internal battery can be discharged even when said plurality of small expansion charge switching circuits have been set to conductive states and charging of any of said plurality of small expansion batteries is being performed.

13. A battery charging and discharging control circuit according to claim 1 comprising:
- an internal discharge switching circuit for connecting said internal battery to a predetermined electric circuit so as to cause said internal battery to discharge;
- an expansion discharge switching circuit for connecting said expansion battery to a predetermined electric circuit so as to cause said expansion battery to discharge; and
- a control circuit for controlling said internal discharge switching circuit and said expansion discharge switching circuit; wherein
  - said control circuit sets only said expansion discharge switching circuit to a conductive state so as to cause said expansion battery to discharge when there exists a remaining amount of charge in said expansion battery.

14. A battery charging and discharging control circuit according to claim 1 wherein said control circuit sets, after discharging of said expansion battery completes, said expansion discharge switching circuit to a non-conductive state and sets only said internal discharge switching circuit to a conductive state so as to cause said internal battery to discharge.

15. A battery charging and discharging control circuit according to claim 1 comprising:
- an internal discharge switching circuit for causing said internal battery to discharge;
- a small expansion discharge switching circuit disposed at said small expansion battery, for discharging the corresponding small expansion battery; and
- a control circuit for controlling said internal discharge switching circuit and said small expansion discharge switching circuit;
- said control circuit individually sets said plurality of small expansion discharge switching circuits to conductive states in a predetermined sequence so as to cause the corresponding plurality of said small expansion batteries to discharge in that sequence when there exists a remaining amount of charge in any of said plurality of small expansion batteries.

16. A battery charging and discharging control circuit according to claim 1 wherein said control circuit sets, after discharging of said small expansion battery completes, said plurality of small expansion discharge switching circuit to a non-conductive state and sets only said internal discharge switching circuit to the conductive state so as to cause said internal battery to discharge.

17. A battery charging and discharging control circuit according to claim 8 wherein said control circuit sets, after charging of said internal battery completes, said internal charge switching circuit to the non-conductive state and sets said plurality of expansion charge switching circuits in sequence to conductive states so as to charge said small expansion batteries in sequence.

18. A battery charging and discharging control circuit according to claim 8 comprising:
- a plurality of small expansion discharge switching circuits, which are disposed to correspond respectively to said plurality of small expansion batteries, for discharging respective corresponding said small expansion batteries;
- said control circuit sets any one of said plurality of small expansion discharge switching circuits to a conductive state so as to set a state in which one of said small expansion batteries can be discharged, even when said internal charge switching circuit has been set to the conductive state and charging of said internal battery is being performed.

19. A battery charging and discharging control circuit according to claim 8 comprising an internal discharge switching circuit for discharging said internal battery, wherein said control circuit sets said internal discharge switching circuit to a conductive state so as to set a state in which said internal battery can be discharged, even when said plurality of small expansion charge switching circuits have been set to conductive states and charging of any of said plurality of small expansion batteries is being performed.

20. A battery charging and discharging control circuit according to claim 8 comprising:
- an internal discharge switching circuit for connecting said internal battery to a predetermined electric circuit so as to cause said internal battery to discharge;

an expansion discharge switching circuit for connecting said expansion battery to a predetermined electric circuit so as to cause said expansion battery to discharge; and a control circuit for controlling said internal discharge switching circuit and said expansion discharge switching circuit; wherein:

said control circuit sets only said expansion discharge switching circuit to a conductive state so as to cause said expansion battery to discharge when there exists a remaining amount of charge in said expansion battery.

21. A battery charging and discharging control circuit according to claim 8 wherein said control circuit sets, after discharging of said expansion battery completes, only said expansion discharge switching circuit to a non-conductive state and sets said internal discharge switching circuit to a conductive state so as to cause said internal battery to discharge.

22. A battery charging and discharging control circuit according to claim 8 comprising:

an internal discharge switching circuit for causing said internal battery to discharge;

a plurality of small expansion discharge switching circuits, of which one small expansion discharge switching circuit is disposed at each one of said expansion batteries, for discharging that corresponding small expansion battery; and a control circuit for controlling said internal discharge switching circuit and said plurality of small expansion discharge switching circuits;

said control circuit individually sets said plurality of small expansion discharge switching circuits to a conductive state in a predetermined sequence so as to cause the corresponding plurality of small expansion batteries to discharge in that sequence when there exists a remaining amount of charge in any of said plurality of small expansion batteries.

23. A battery charging and discharging control circuit according to claim 8 wherein said control circuit sets, after discharging of said plurality of small expansion batteries all completes, said plurality of small expansion discharge switching circuits to non-conductive states and sets only said internal discharge switching circuit to the conductive state so as to cause said internal battery to discharge.

* * * * *